United States Patent

[11] 3,570,530

[72] Inventor Frank Fuis, Jr
     Norris, Tenn.
[21] Appl. No. 875,885
[22] Filed Nov. 12, 1969
[45] Patented Mar. 16, 1971
[73] Assignee The United States of America as represented
     by the United States Atomic Energy
     Commission

[54] PRESSURE REGULATOR FOR A CIRCULATING
     FLUID SYSTEM
     9 Claims, 2 Drawing Figs.
[52] U.S. Cl. .................................................. 137/494,
                                         137/505.46, 128/142.2
[51] Int. Cl. .................................................. F16k 17/02
[50] Field of Search .................................. 137/494,
                 505.13, 505.46, 505.47; 128/142.2, 142.5;
                                                 251/(Digest)

[56]           References Cited
            UNITED STATES PATENTS
3,049,896  8/1962  Webb .......................... 128/142.5
3,370,585  2/1968  O'Neill ........................ 128/142.2

Primary Examiner—Harold W. Weakley
Attorney—Roland A. Anderson

ABSTRACT: A regulator valve has been provided which automatically controls pressure within a circulating fluid system by regulating the exhaust flow from the system. In the illustrated embodiments the regulator utilizes a diaphragm driven flexible gate arrangement which opens and closes an exhaust port by virtue of an essentially friction-free rolling action to maintain a delicate balance between supply and exhaust air, thereby regulating the pressure inside the system according to a predetermined bias setting.

Patented March 16, 1971 3,570,530

INVENTOR.
Frank Fuis, Jr.
BY
ATTORNEY.

PRESSURE REGULATOR FOR A CIRCULATING FLUID SYSTEM

BACKGROUND OF THE INVENTION

In a circulating fluid system, especially for circulating air in an environmental suit, it is often desirable to provide a very close balance between the inside and outside pressure. Air flow through an environment suit, for example, must be closely regulated for the safety and ease of movement of the wearer. The air flow system provides fresh air for breathing, permits controlled cooling, keeps down excessive moisture accumulation, and moves carbon dioxide and other impurities. An optimum balance between supply air and the exhaust is desirable so that the suit's internal pressure does not become so excessive as to "balloon" (stiffen) the suit, nor yet so low as to approach negative pressure causing "prune-skin" effects on the wearer, and even endangering the wearer's oxygen supply. Further, regulation should be automatic, leaving the wearer's mind and hands free for performing his work.

In the prior art, manually controlled regulators have been used which require the wearer's manipulating an adjusting screw to keep his suit at a desired pressure. A disadvantage of this type of regulator is that a different flow adjustment must be made for different positions taken by the wearer. For example, when changing from the standing to the squatting position, there will need to be a slight depressurization of the suit to prevent ballooning due to compression brought about by decrease in suit volume due to the change in position.

An automatic regulator known in the prior art utilizes a diaphragm-operated rigid gate which opens the exhaust port by sliding a gate a varying amount across a port opening. The sliding gate has the following disadvantages: (a) built-in air leak is necessary to make the gate easy to move under conditions of internal air pressure and full vacuum; (b) diaphragm action is impeded by frictional "drag" of the gate due to pressure and vacuum, tending to hold the gate firmly against the exhaust port, thus making the regulator inoperative in the very low pressure range; and (c) the inherent leak also narrows the functional pressure range through which the regulator is operable.

SUMMARY OF THE INVENTION

An object of this invention is to provide an improved pressure regulator for a circulating fluid system.

It is another object of this invention to provide an automatic flow regulator valve which utilizes a diaphragm driven flexible gate arrangement which opens and closes an exhaust port by essentially friction-free rolling action to maintain a delicate balance between supply and exhaust flow in a circulating fluid system.

Further, it is an object of this invention to provide an improved air flow regulator for automatically controlling the pressure within an environmental suit.

Briefly, the invention resides in a pressure regulator for a circulating fluid system consisting essentially of an enclosure member carrying an inlet duct and an exhaust port through which the fluid is exhausted from said system; an elongated beltlike flexible gate having one end secured and selectively extendible over the port; a roller assembly engaging the flexible gate for extending it transversely across the exhaust port; means coupled with the roller which urges the flexible gate over the exhaust port and holds the gate against the port; and a pressure sensitive actuator coupled with the roller tending to cause the roller to retract the flexible gate from the exhaust port thereby varying the exhaust flow in a manner to regulate the system pressure at a preset value.

Other objects and many of the attendant advantages of the present invention will be evident from the following detailed description when taken in conjunction with the accompanying drawings.

DETAILED DESCRIPTION

Figure 1:
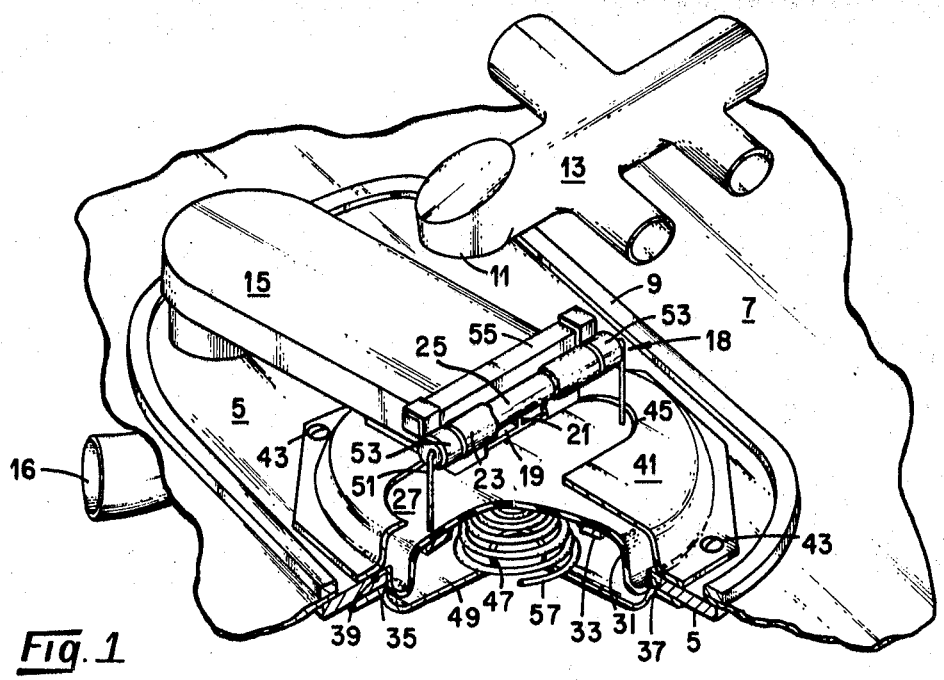
FIG. 1 is a pictorial view partially in section of a regulator valve according to the present invention.

Referring now to FIG. 1, there is shown a pressure regulator valve according to the present invention as adapted for use in an environmental suit for the purpose of illustrating the invention. The view shown is that seen from the inside of the suit. A regulator mounting plate 5 is adapted for sealable attachment to an environmental suit 7 by means of a compression flange 9. Air enters the suit by an external duct (not shown) which enters through the mounting plate at 11 into a flow distributor 13 which distributes air to the interior of the suit. An exhaust duct 15 is connected to an external vacuum system by means of an outlet line 16. The exhaust duct 15 is rigidly mounted to the mounting plate 5 in order to hold the duct in a fixed position with respect to the gating mechanism 18. The duct 15 is generally rectangular in cross section and is open at the inward end to form an exhaust port 19. The gating mechanism is supported over the port 19 by means of webs 21 welded across the port 19.

The gating mechanism 18 is formed by means of a fluid impermeable flexible material such as a belt of nylon coated on one side, or both sides, with neoprene forming a flexible gate 23 which extends over a roller 25. One end of gate 23 is connected to the lower edge of the exhaust duct 15 and blends over the port 19, allowing the roller to roll the gate 23 over the port. In this arrangement, roller 25 is linked to a diaphragm 27 by a rigid bracket 51 and the flexible gate 23 is bonded to the roller 25 and rolled thereabout. To provide rolling action of the roller 25 when the diaphragm 27 oscillates, a pair of anchor straps 53 are provided each having one end bonded to respective ends of the roller 25. The ends of roller 25 extend past port 19 and the straps are wrapped about the roller in opposing direction to that of the flexible gate 23. The other ends of anchor straps 53 are connected to a cleat 55. The anchor straps 53 are preferably made of nylon bands coated with neoprene. The anchor straps serve to impart rotation to roller 25 to help keep the roller in proper alignment over the port 19 and to keep the flexible gate 23 taut so that as diaphragm 27 oscillates, the flexible gate 23, attached to the roller 25, is caused to wind and unwind about the roller. Diaphragm 27 is biased negatively or positively by a biasing spring 57 disposed between the outer surfaces of the diaphragm 27 and the diaphragm cover plate 49 which may be either a tension or compression type, depending, respectively, upon whether it is desired to actuate the diaphragm by a negative or a positive internal pressure. A leaf type spring (not shown) mounted between the diaphragm and the cover plate 49 may be substituted for coil spring 57 with equally satisfactory results and is preferable for negative actuation of the diaphragm. It has also been found that a desired additional feature (not shown in the drawings) is to cover the interior gate mechanism with a heavy guage screen guard which may be mounted integrally with stop plate 41.

The diaphragm 27 is of conventional design including a rubber disc 31 reinforced at its central section by means of an aluminum disc 33 bonded to the rubber disc 31 to allow the gate mechanism to be easily connected thereto a conventional manner. The diaphragm is sealably mounted within a circular opening 35 of the mounting plate 5. Plate 5 has an annular groove 37 adjacent the edge of opening 35 which receives a molded annular ring portion 39 of diaphragm 27. The diaphragm is held in place and sealed by means of a diaphragm stop plate 41 mounted on the mounting plate 5 by means of screws 43 to allow easy access to repair or replace the diaphragm 27. The stop plate 41 has a central opening 45 through which the gating mechanism operates, and which exposes the inner side of the diaphragm 27 to the internal pressure. The outer side of diaphragm 27 is exposed to the external pressure by means of an opening 47 is a diaphragm protector cover plate 49 mounted on the mounting plate 5 over the opening 35.

Figure 2:
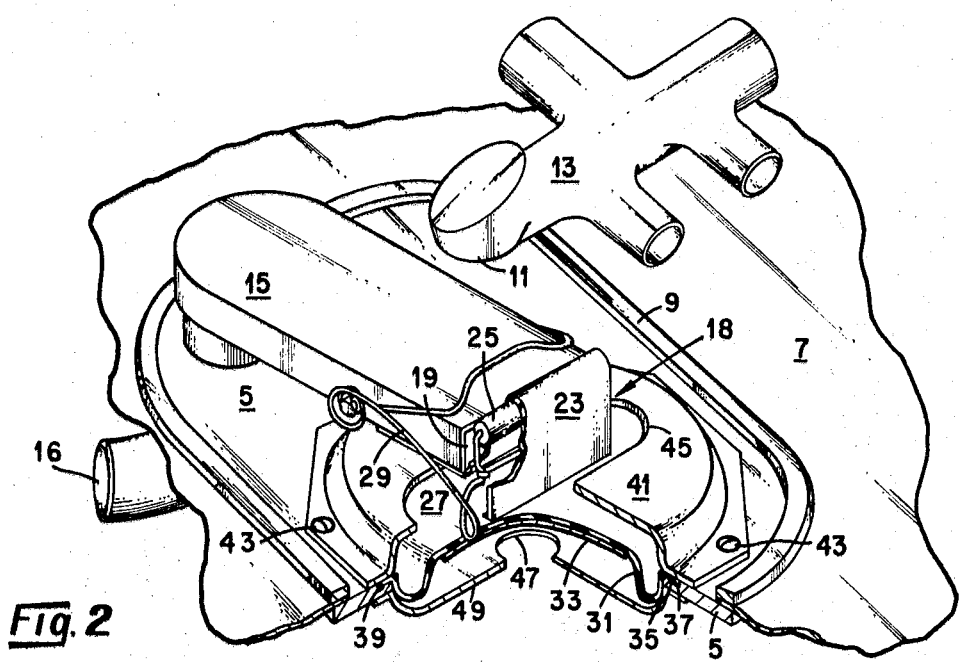
FIG. 2 is a pictorial view partially in section of an alternate embodiment of a regulator valve according to the present invention.

Referring now to FIG. 2 there is shown an alternate embodiment of a pressure regulator according to the present invention wherein like parts are designated by like reference numerals. In this arrangement the opposite end of gate 23 extends over the roller 25 and is connected to a pressure sensitive diaphragm 27. The roller 25 holds the gate 23 against the end of duct 15 and is urged to close the port 19 by means of a wire bias spring 29. As diaphragm 27 moves outward under increasing pressure, roller 25 is driven across the port 19 of the exhaust duct 15 allowing the gate 23 to be rolled away from and thereby exposing the port 19. This gate operating mechanism is essentially friction free and forms an effective seal over the exhaust port 19. In this particular embodiment, the tension of spring 29 is selected to provide the necessary operating pressure differential between the interior and exterior of the suit.

In one mode of operation, a source of air is attached to the inlet flow distribution 13 and a source of vacuum is connected to the outlet line 16. A bias spring, either 57 (FIG. 1) or 29 (FIG. 2), having the desired tension is selected so as to maintain a preset pressure differential. The pressure differential is essential to provide adequate air flow through the suit for respiration and cooling and yet permit free movement by the wearer. As a deviation from the desired pressure level occurs, diaphragm 27 moves inwardly or outwardly, rolling a portion of the flexible gate 23 on or off, covering or exposing the upper edge of the exhaust port 19. Thus, diaphragm 27 oscillates back and forth opening and closing the exhaust port 19 to maintain the desired flow of air through the suit. Compression of air in the suit caused by bending movements (thus stiffening the suit making movement more difficult) is quickly corrected by the regulator since the pressure forces the diaphragm outward, thus opening the exhaust port 19 to maximum exhaust flow. Once the pressure has been reduced to the preselected value, the diaphragm again oscillates keeping the balance of air flow and thus regulating the suit pressure. When the wearer moves from a squatting to a standing position, the diaphragm retracts and the flexible gate is urged to roll over the exhaust port thereby closing the flexible gate, stopping the exhaust flow until the preset pressure level is again established.

Obviously many modifications may be made within the teachings as set forth and claimed hereinafter. For example, various pressure sensitive devices may be substituted for the diaphragm 27 which drives the roller 25 responsive to the internal pressure level. For applications other than an environmental suit the pressure sensitive device may be an enclosed chamber having a fixed pressure reference against which the internal system pressure is balanced to regulate the flow rate of a circulating fluid flow system.

In the manufacture of the structural components for the above-described environmental suit in this application, aluminum has been used to minimize the weight of the unit. It may be found in various other applications certain plastics or highly noncorrosive metals would be advantageously used for the structural components of the valve.

Thus, it will be seen that a flow regulator valve for a circulating fluid system has been provided which affords better automatic regulation within closer tolerances than previous flow regulator valves due to the essentially friction-free rolling action of the gating assembly which selectively rolls a flexible gate member over the exhaust port eliminating frictional drag encountered in flow regulators which, for example, have sliding metal-to-metal or rubber-to-metal flow gating members.

I claim:

1. A pressure regulator for a circulating fluid system, comprising:
    an exhaust port;
    an elongated beltlike flexible gate extendible over said port for adjustably covering said exhaust port so as to control the flow of fluid therethrough, said gate having one end fixed;
    a roller means engaging said flexible gate for extending said gate transversely across said exhaust port;
    means coupled with said roller urging said roller to extend said flexible gate over said exhaust port and hold said flexible gate against said port; and
    pressure sensitive actuator means coupled with said roller tending to cause said roller to retract said flexible gate from said exhaust port.

2. A pressure regulator as set forth in claim 1 wherein said pressure sensitive actuator means coupled with said roller includes a diaphragm mounted so as to be actuated by pressure fluctuations within said system and means connecting said diaphragm to said roller whereby the movement of said diaphragm is transmitted to said roller so as to roll said roller transversely across said port.

3. A pressure regulator as set forth in claim 2 wherein said beltlike flexible gate extends over said roller and is connected to said diaphragm.

4. A pressure regulator as set forth in claim 3 wherein said means coupled with said roller urging said roller to extend and hold said flexible gate over said exhaust port includes a bias spring having one end fixed and rotatably coupled to said roller.

5. A pressure regulator as set forth in claim 3 wherein said beltlike flexible gate extends over said roller and connected thereto so that as said roller is retracted said gate is rolled about said roller exposing said exhaust port and said roller is rotatably coupled to said diaphragm so as to cause said roller to roll back and forth with the action of said diaphragm.

6. A pressure regulator as set forth in claim 5 wherein said means coupled with said roller urging said roller to extend and hold said flexible gate over said exhaust port including a bias spring coupled with said diaphragm so as to urge said diaphragm into a position closing said exhaust port and at least one elongated strap wound about said roller in opposite direction to the flexible gate and having one end fixed so as to cause said roller to roll up said flexible gate as said roller is retracted thereby opening said port.

7. A pressure regulator as set forth in claim 6 wherein said roller is held in place over said port by means of a pair of said straps wrapped about each end of said roller and fixed at one end so as to align said roller over said port.

8. An air pressure regulator for automatically controlling the exhaust air flow from an environment suit, comprising:
    a mounting plate adapted for attachment to said suit;
    means attached to said mounting plate for supplying air to the interior of said suit;
    means attached to said mounting plate forming an exhaust port for exhausting air from said suit;
    a pressure actuated diaphragm mounted in an opening in said mounting plate;
    an elongated beltlike flexible gate having one end secured to said exhaust port means adjacent said port and adjustably extendible over said port so as to control the flow of air therethrough;
    a roller assembly rollably engaging said flexible gate and driven by said diaphragm for extending said belt transversely across said exhaust port; and
    a bias spring coupled to said roller assembly so as to urge said roller into a closed position over said port.

9. An air pressure regulator as set forth in claim 8 wherein said flexible gate is secured about said roller and further including a pair of elongated flexible anchor straps each having one end fixed at the opposite side of said exhaust port and extendible along the edges of said port, said straps being wrapped around said roller at each end thereof, respectively, in opposite direction to that of said flexible gate so as to impart rotation to roller, to hold said gate in alignment with said port, and to keep the flexible gate taut so that as said diaphragm oscillates said gate is wound and unwound about said roller, thereby maintaining a desired flow of air through said suit.